United States Patent Office

3,280,206
Patented Oct. 18, 1966

3,280,206
COOLANT RECLAMATION PROCESS
Daniel A. Scola, Andover, and Robert J. Wineman, Concord, Mass., assignors, by mesne assignments, to the United States of America as represented by the United States Atomic Energy Commission
No Drawing. Filed Oct. 17, 1962, Ser. No. 231,271
10 Claims. (Cl. 260—674)

The invention described herein was made or conceived in the course of or under a contract with the U.S. Atomic Energy Commission.

This invention deals with systems which employ organic fluids for cooling or cooling and moderating a nuclear reactor and more particularly provides a new and valuable method of reclaiming such fluids after use so that they may subsequently serve as fresh coolants.

The technical and economic feasibility of organic-moderated and cooled power reactors had been proven in the Organic Moderated Reactor Experiment (OMRE) wherein there has been demonstrated the relatively low decomposition rates of the organic coolants (C. A. Trilling "OMRE Operating Experience," Nucleonics 17 No. 11, page 113 (1959). The organic coolants are generally biphenyls or polyphenyls or mixtures which may include biphenyl, the terphenyls and higher polyphenyls up to, say, octaphenyl and triphenylenes, and alkylation products thereof wherein one or more benzene rings are substituted by a lower alkyl radical, i.e., methyl, ethyl, propyl, or isopropyl. The preferred coolants are mixtures of polyphenyls having a vapor pressure lower than that of biphenyl, and consisting at least about 90 percent by weight of polyphenyls boiling in the terphenyl range. Santowax R, Santowax OM and Santowax OMP, which are registered trade-marked products produced by Monsanto Chemical Company, are typical, commercially available coolants.

| Weight percent of— | Santowax OMP | Santowax OM | Santowax R |
|---|---|---|---|
| Biphenyl | | 5 | 0.6 |
| m-Terphenyl | 60 | 30 | 49 |
| o-Terphenyl | 12 | 60 | 10 |
| p-Terphenyl | 28 | 5 | 26 |
| Other hydrocarbons | | | 14.5 |

It will be noted that Santowax OMP is a mixture of isomeric terphenyls, that Santowax OM contains a small amount of biphenyl in addition to the terphenyls, and that Santowax R is a less refined product. The "other" hydrocarbons are high boiling pyrolysis products and intermediates produced in the cracking process by which Santowax R is manufactured. Santowax OM was used as OMRE Core I Coolant and Santowax R as OMRE Core II Coolant. Increasing content of m-terphenyl reduces the solidification point. Other polyphenyl fluids of use as organic coolants and coolant-moderators in nuclear reactors are biphenyl, monoisopropylbiphenyls or mixtures of monoisopropylbiphenyls with no more than 20% of biphenyl as described in U.S. Patent No. 2,902,425.

The polyphenyls, like organic materials generally, possess a tendency to decompose when subjected to heat and/or ionizing radiation. The decomposition products recombine to form molecules of greater molecular weight than those present in the original mixture of polyphenyls. There often occurs, also, a polymerization of the fragments or of the original polyphenyls. Thus, a typical composition of OMRE high boiler has been found to consist of alkylterphenyls, quaterphenyls, alkylquaterphenyls, quinquephenyls, hexaphenyls, heptaphenyls, octaphenyls, triphenylenes, phenyltriphenylenes, alkyldiphenyltriphenylenes, etc.

As the coolant is used, its composition changes owing to the pyrolysis and the radiolysis, and the average molecular weight of the coolant increases with time owing to the ever-increasing content of the high molecular weight products. The high molecular weight products thus formed will be hereinafter referred to as high boilers because the boiling range thereof is higher than that of the original coolant. This change in composition may actually be beneficial up to a certain point, since a higher molecular weight average means a lower melting point and possibly a lower decomposition rate. However, it has been found that increase of the high boilers cannot be permitted to continue indefinitely, because of undesired effect on the heat transfer properties. In a nuclear reactor using the terphenyl coolants, the high boilers which are steadily built up in the fluid can be tolerated up to a weight content of, say, about 30% to 40% by weight of the fluid without a substantial decrease in heat transfer. It is preferred, at least for nuclear reactor moderator and/or coolant use that percentage of high boilers in the fluid not exceed about 50%, and more preferably not above about 40%.

In view of the above, it is obvious that a disadvantage of the organic reactor is that heat and radiation cause deterioration of the polyphenyl coolant with production of high boilers in undesired quantities and that for continued operation, the detrimental high boiler content of the spent coolant must be separated therefrom and replaced by a mixture of fresh polyphenyls. This may be done, e.g., by periodically removing batches of the coolant fluid from the main coolant stream, purifying it of high boilers by, e.g., low pressure distillation to remove material boiling up to and including p-terphenyl, returning the purified fluid with additional fresh make-up to the reactor system and conducting the high boiler residue to waste storage.

Accumulation of the waste represents a weak point in the economics of the organic coolant process. Employing the Santowax coolants described above, power plants in the 300 mwe range would produce as much as 25,000 pounds of high boiler per day. Hence a means of reclaiming the high boiler is not only desirable but a necessity in the attainment of an economically expedient method of, say, producing electrical power for civilian use by means of organic cooled and moderated nuclear reactors, and organic cooled and water moderated nuclear reactors.

Accordingly, an object of the invention is the provision of a method of removing high boiler from polyphenyl coolant. Another object of the invention is the conversion of such high boiler into industrially useful material. A further object is the conversion of such high boiler into material which can be incorporated into the parent coolant without detriment to heat transfer property of the coolant. Still a further object is to develop a method for reclaiming as large a percentage as possible of high boiler present in spent polyphenyl coolant. Another object of the invention is to reduce the cost of organic coolants for nuclear power reactors by removal of the detrimental component of the spent coolant. A further object is the production of reclaimed coolant which possesses reduced fouling ability. A most important object is the separation of the undesirable components of spent polyphenyl coolant and recovery of material suitable for coolant use.

These and other objects of the invention hereinafter disclosed are provided by the invention wherein there is employed a solvent distribution process for reclaiming high boiler or spent coolant which results in the production of reclaimed coolant which possesses superior properties relative to spent coolant and the high boiler. These properties are as follows:

(1) Reduced fouling ability.
(2) Lower ash content.
(3) Better thermal stability.
(4) Lower carbon-to-hydrogen ratio.
(5) Lower oxygen content.
(6) Lower molecular weight.

With respect to (4) and (6), above, it should be pointed out that these properties, as well as viscosity, for reclaimed spent coolant are not changed appreciably relative to starting spent coolant. This is expected, since the terphenyl concentration is high initially and shows slight increase after removal of the high molecular weight components. The thermal decomposition temperature of the reclaimed coolant is markedly increased. Reclaimed high boiler shows more favorable properties as compared to high boiler.

According to the invention, OMRE high boiler is separated into an insoluble, high molecular weight fraction and a soluble, low-molecular weight fraction (reclaimed coolant) by contacting it with (A) an inert organic solvent for the high boiler which is capable of dissolving at least about 0.7 gram of high boiler per gram of solvent at a temperature of about 25° C. to 200° C. and (B) an inert organic liquid capable of dissolving only less than about 0.3 gram of high boiler per gram of said liquid at the same temperature, the proportion of (A) to (B) being from 90:10 to 10:90 parts by volume, and the proportion of the total volume of (A)+(B) to the volume of high boiler being from 2 to 1 to 20 to 1.

Examples of presently useful inert organic solvents which are capable of dissolving at least about 0.7 gram of the high boiler per gram of solvent are carbon tetrachloride, chloroform, tetrahydrofuran, diethylene glycol dimethyl ether and benzenoid hydrocarbons which are free of olefinic and acetylenic unsaturation and boil at a temperature which is below the boiling point of high boiler, e.g., benzene, toluene, ethylbenzene, xylene, mesitylene, biphenyl, the lower alkylbiphenyls, and the terphenyls. Such materials will be hereinafter referred to as good solvents of high boiler.

Examples of presently useful inert organic liquids which are capable of dissolving only less than about 0.3 gram of high boiler per gram of said liquid are absolute ethanol and other lower alkanols, the normally liquid alkanes and cycloalkanes such as hexane, octane, decane, dodecane, cyclohexane, and mixtures of petroleum hydrocarbons such as kerosene and the various naphthas and other essentially paraffinic and cycloparaffinic petroleum distillates, acetone and other alkanones, alkyl ethers such as ethyl or propyl ether, alkyl alkanoates such as ethyl acetate or methyl butyrate, etc. These will be hereinafter referred to as poor solvents of high boiler. The solubility of high boiler in some of such liquids at 23° C. has been determined to be as follows:

| Solvent: | G. high boiler per 100 g. solvent |
|---|---|
| Absolute ethanol | 0.83 |
| Hexane | 1.1 |
| Acetone | 7.77 |
| Ethylene glycol diethyl ether | 8.15 |
| Ethyl ether | 8.73 |
| Ethyl acetate | 9.14 |

The presently provided reclamation process may be conducted by contacting the high boiler with the solvent pair in a stepwise manner or simultaneously. Thus by a procedure which can be best described as solubilization-precipitation, the method consists of dissolving the high boiler in a known volume of the good solvent and precipitating a high molecular weight fraction from the resulting solution by adding a known volume of the poor solvent. A one-step procedure involves adding a mixture of the good solvent and the poor solvent in predetermined ratio to the high boiler. Some commercial solvents are mixtures of good and poor solvents, and are particularly useful in this connection. This method is simply a dilution-precipitation technique wherein solubilization is arrived at only incidentally while the high boiler is in intimate admixture with the solvent pair. As will be shown hereinafter, this one step process gives yields of reclaimed product which are essentially as good as those obtained in the stepwise solubilization-precipitation procedure; also the average molecular weight of product obtained by either method is of roughly the same order.

Depending upon the aromatic content of the material to be treated, hydrocarbon solvents boiling between 80° to 280° C. consisting up to 100% by weight of saturated, aliphatic hydrocarbons and having an aromatic hydrocarbon content of not more than 70% by weight are generally useful in either the one-step or the two-step process.

As has been pointed out above, both biphenyl and terphenyl are good solvents for high boiler. Spent coolant, consisting as it does of biphenyl, terphenyl and high boiler, thus has a built-in, good solvent of high boiler, i.e., the low boiling materials or "low boiler" which consists essentially of biphenyl and the terphenyls. The low boiler is useful as the aromatic component of an aromatic-aliphatic binary solvent system for reclamation of high boiler. Thus, instead of first distilling in order to separate high boiler from the spent coolant, then solubilizing the separated high boiler by treatment with a good solvent, e.g., an extraneous aromatic hydrocarbon, and finally treating the solubilized high boiler with the poor solvent, e.g., an aliphatic precipitant, the spent coolant per se can be treated with the poor solvent. Advantageously, a quantity of the poor solvent, which may be e.g., kerosene or propyl ether, is employed which is at least equal to the weight of the low boiler content of the spent coolant, and the low boiler-to-solvent ratio may be constantly decreased in order to ascertain the optimum quantity of poor solvent required for effecting precipitation of the insoluble portion of high boiler. Conveniently the poor solvent has a boiling point which is below the low boiler so that possible difficulty in ridding the treated product of the solvent additive will not be encountered.

As will be obvious to those skilled in the art, use of spent coolant rather than separated high boiler in the reclamation process obviates the necessity of distilling spent coolant previous to the solvent treatment. While treatment of spent coolant rather than of the separated high boiler thus appears to be of the greater economic advantage, particularly if the solvent volume is of substantially the same order in both methods, the choice of treatment is necessarily dictated by reactor conditions. When only the high boiler is treated, the volume of the latter which is removed for treatment can readily be replaced in substantially a continuous manner, and facilities for handling large volumes of material need not be provided.

In operation, after the high boiler content of the coolant has reached a predetermined value (as determined by distillation of the sample) a constant stream of the spent coolant may be withdrawn from the reactor system into a still, where the spent coolant may be distilled and the distillate therefrom condensed and returned to reactor system as fresh coolant. The residue from the distillation consists of high boilers which are reclaimed by the presently provided process. When withdrawal of spent fluid, distillation and return of distillate to the coolant is constant, there is no interruption in operation and residual high boiler can be accumulated and reclaimed batchwise and whenever convenient. However, instead of distilling the continuously removed spent coolant it may be washed continuously with an organic liquid which is a poor solvent for high boiler, e.g., the spent fluid may be pumped in countercurrent flow to a poor solvent of high boiler such as naphtha or kerosene or the spent coolant may be vigorously agitated with said poor solvent. After filtration by centrifugation or other means to remove the precipitated insolubles, the filtrate is distilled to free it from said solvent and the residue returned to the coolant system.

The volume of total solvent required for satisfactory reclamation of high boiler will generally be from 2 to 20 times the volume of high boiler, and the ratio of good solvent to poor solvent will vary, from say 90:10 to 10:90%, and preferably from 50:50 to 15:85 parts. The objective is to obtain from high boiler all material which has the characteristics of the original coolant with respect to carbon-hydrogen content, average molecular weight and viscosity. The latter property appears to be particularly indicative of heat transfer capacity. High boiler will often have a Brookfield viscosity of as high as 10–20 cps. at 265° C. At these values, heat transfer is substantially inhibited. However, employing a 50:50 volume ratio of benzene to hexane with the high boiler, the high-molecular, undesirable components thereof precipitate out to give, after filtration and removal of solvent, a material which has a Brookfield viscosity of only 5.7 cp. at 265° C. Employing a 30:70 volume ratio of benzene to hexane, the viscosity of only 3.7 cp. is obtained upon similar treatment. The volume of total solvent employed is not at all critical, the only requirement being manipulative, i.e., ease of handling to facilitate intimate, thorough contact of high boiler and solvent. The temperature and time are also not critical. The process will operate at room temperature as well as at temperatures which may be up to the volatilization temperature of the solvent. As will be appreciated by those skilled in the art, temperature of the process will be a function of the solubilizing capacity of the solvents. In practice, coolant offstream from the reactor will be treated before cooling to room temperature. It is expedient not to lose the heat energy the coolant has. The process might probably be operated with coolant at 100–150° C.

The time element is a variable which depends upon the solubilizing capacities of the solvent components, quantities of material worked with, temperature, etc. Generally, in the two-step process, after high boiler has been dissolved by the efficient solvent addition of the poor solvent results in almost immediate precipitation of the insoluble portion of high boiler. This is filtered off, the filtrate is distilled to remove solvent and the residue is added to the coolant system.

It is because solubilization and precipitation are so readily effected that the one-step, dilution-precipitation process is made possible. Here high boiler is simultaneously contacted with both the good solvent and the poor solvent. Volume-ratio, temperature and time conditions are substantially those employed in the two-step process.

In treating spent coolant, rather than separated high boiler, with solvent, the volume of poor solvent to be added is calculated, of course, on the low boiler content of the spent coolant. Thus if the spent coolant contains 35 parts by volume of high boiler and 65 parts by volume of low boiler, and it is desired to employ a 20:80 volume ratio of good solvent to poor solvent; then, since the low boiler is good solvent, there should be used 260 parts by volume of poor solvent. In this case, there would be present 65 plus 260 or 325 parts by volume of total solvent per 35 parts by volume of high boiler.

The invention is further illustrated by, but not limited to, the following examples.

*Example 1*

Santowax OM was employed as organic coolant in a nuclear reactor. The reactor was operated until the coolant had about a 38% concentration of material boiling above the boiling point of para-terphenyl. A portion of the spent coolant (hereinafter referred to as Core I spent coolant) was removed and distilled. That part which boiled above the boiling point of the terphenyls was designated as OMRE Core I high boiler and treated as follows by a dilution-precipitation technique:

Into a flask was weighed 10.0 g. of high boiler. There was added thereto a volume of benzene calculated to give the desired benzene-hexane volume ratio in a total of 100 ml. of solvent, and the resulting mixture was heated to attain solution. The solution was maintained at 60° C. while the calculated quantity of hot hexane was added thereto with vigorous stirring. When all the hexane had been added, it was allowed to stand at room temperature overnight. At the end of that time the mixture was filtered by suction through a filter aid and the precipitate (A), comprising insoluble high boiler, was washed with two 50-ml. portions of hexane. The washings and filtrate (which comprised soluble high boiler) were poured into a weighed 500 ml. beaker and the solvent was evaporated by heating on a steam bath and finally by heating in vacuo at 120° C. for 2 hours. The residue thus obtained represented the soluble portion of the high boiler and is thus noted in Table 1 which follows. The precipitate (A) was dissolved in boiling benzene, filtered through a filter aid, and the filtrate evaporated first on the steam bath and finally in vacuo at 120° C. for 2 hours to give as residue the material which is noted as insoluble in Table 1 below. The soluble and insoluble materials thus obtained were found to have the physical and chemical characteristics shown in the following table.

TABLE 1.—DIFFERENTIAL SOLUBILITY STUDIES OF HIGH BOILER IN BENZENE-HEXANE (B–H) SOLVENT PAIR

| Solvent Pair Vol. Ratio B–H | Percent Yield | | C/H Ratio | | Melting Range, °C. | | Avg. Mol. Wt. | |
|---|---|---|---|---|---|---|---|---|
| | Sol. | Insol. | Sol. | Insol. | Sol. | Insol. | Sol. | Insol. |
| 100:0 | 100 | | 1.40 | | 75–100 | | 600 | |
| 90:10 | 92 | 6.5 | 1.40 | 1.53 | 88–95 | 98–168 | 590 | 1,350 |
| 70:30 | 85 | 11 | 1.46 | 1.55 | 80–86 | 120–195 | 500 | 1,250 |
| 50:50 | 74 | 24 | 1.38 | 1.55 | 63–83 | 112–170 | 450 | 1,040 |
| 30:70 | 58 | 39 | 1.32 | 1.55 | 48–72 | 126–184 | 460 | 1,025 |
| 10:90 [1] | 47 | 52 | 1.35 | 1.55 | 36–47 | 102–152 | 450 | 890 |
| 0:100 | 25 | 70 | 1.26 | 1.52 | 33–40 | 124–148 | 390 | 650 |

[1] 20 g. high boiler with 40 ml. benzene and 360 ml. hexane.

The above data show some interesting trends. From benzene-to-hexane volume ratios of 70:30 to 10:90 there is separation of lower molecular weight high boiler from higher molecular weight high boiler in good yields (85% and 47%, respectively). There is a decrease in the melting range of the soluble fraction of high boiler, suggesting that selective solubility of various components occurred. The soluble portions have carbon-to-hydrogen ratios of 1.32 to 1.46, with average molecular weights of 390 to 590. These data indicate that the soluble fractions are polyphenyls containing about 5 to 8 rings with some saturation and possibly some alkylation. The insoluble fractions having carbon-to-hydrogen ratios of 1.52–1.55 and average molecular weights of 650–1350 consist essentially of components having about 8 to 18 rings. In each case, the insoluble high boiler fraction is a brittle, jet black material.

*Example 2*

Reclamation of the high boiler (Core I HB) described in Example 1 was conducted by employing a benzene-ethyl ether binary system. The experiments were performed in the same manner as the benzene-hexane experiments of Example 1 except that the benzene solution of high boiler was cooled to 33° C. before the calculated amount of warm ether was added. The following results were obtained.

ene filtrate containing the insoluble fraction were charged to rotating evaporators heated by oil baths, and the last traces of solvent were removed at 200° C. and 0.5–1.0 mm. Hg. The soluble fraction, after weighing, was melted and decanted from the flask. The insoluble fraction, after weighing, was dissolved a second time in hot TABLE 2.—DIFFERENTIAL SOLUBILITY STUDIES OF HIGH BOILER IN BENZENE-ETHER (B-E) SOLVENT PAIR

| Solvent Pair Vol. Ratio B–E | Percent Yield | | C/H Ratio | | Melting Range, °C. | | Avg. Mol. Wt. | |
|---|---|---|---|---|---|---|---|---|
| | Sol. | Insol. | Sol. | Insol. | Sol. | Insol. | Sol. | Insol. |
| 100:0 | 100 | | 1.40 | | 75–110 | | 600 | |
| 90:10 | 97 | 1.0 | 1.43 | 1.61 | 82–87 | | 550 | (1) |
| 70:30 | 92 | 6.0 | 1.41 | 1.55 | 74–82 | 192–211 | 511 | 1,270 |
| 50:50 | 84 | 15 | 1.38 | 1.58 | 64–73 | 172–193 | 495 | 1,400 |
| 30:70 | 76 | 24 | 1.42 | 1.65 | 55–62 | 93–218 | 480 | 2,170 |
| 10:90 | 72 | 27 | 1.49 | 1.62 | 56–63 | 133–168 | 460 | 1,700 |
| 0:100 | 59 | 40 | 1.32 | 1.54 | 43–53 | 104–182 | 425 | 1,000 |

[1] Insufficient recovery for molecular weight determination.

*Example 3*

Viscosity studies were conducted on the soluble fractions obtained in the benzene-hexane process of Example 1 and in the benzene-ether process of Example 2. A change in viscosity of reclaimed coolant was found with each change in benzene-hexane or benzene-ether ratio as shown in Table 3.

TABLE 3.—VISCOSITY OF RECLAIMED HIGH BOILER FROM BENZENE-HEXANE-HIGH BOILER AND BENZENE-ETHER-HIGH BOILER TERNARY SYSTEMS

| B/H[1] or B/E Vol. Ratio | Percent Soluble High Boiler | | Brookfield Viscosity, cp. at 265° C. | | Percent Decrease in Viscosity from High Boiler | |
|---|---|---|---|---|---|---|
| | B/H | B/E | B/H | B/E | B/H | B/E |
| 100:0 | 100 | 100 | 18.5 | 18.5 | | |
| 90:10 | 92 | 97 | | 14.4 | | 22 |
| 70:30 | 85 | 92 | 9.2 | 10.5 | 50 | 43 |
| 50:50 | 72 | 84 | 5.7 | 7.4 | 69 | 60 |
| 30:70 | 58 | 76 | 3.7 | 5.3 | 80 | 71 |
| 10:90 | 47 | 72 | 2.4 | 3.8 | 87 | 79 |
| 0:100 | 25 | 59 | 2.4 | 3.1 | 87 | 83 |

[1] B/H is benzene-hexane. B/E is benzene-ether.

The viscosity decreased by 22–87% compared to high boiler; whereas the yields of this reclaimed coolant were 97–47%, respectively.

Viscosity measurements conducted at 265° C. on solutions consisting of 30 weight percent of reclaimed high boiler in the Santowax coolant gave values between 0.80 cp. and 1.1 cp. The viscosities of these solutions compare favorably with that of the original Santowax (0.80 cp.) at the same temperature.

*Example 4*

This example shows the use of xylene-kerosene systems for reclamation of the high boiler (Core I high boiler) described in Example 1. The xylene used was a commercial mixture of isomeric xylenes.

To 50 g. of high boiler there was added a volume of the xylene calculated to give the desired xylene-kerosene volume ratio in a total of 500 ml. of solvent. The mixture of high boiler and xylene was maintained at 100° C. with stirring of solution, and kerosene at 60° C. was then added with vigorous stirring and stirring was continued at 90–100° C. for about 20 minutes. The mixture was then allowed to stand at room temperature overnight and then filtered through a Buchner funnel containing a mat of filter aid (1 g. filter aid/100 g. solution). The damp filter cake collected was then dissolved in hot benzene and filtered to remove the spent filter aid. Both the xylene-kerosene filtrate and the benzene filtrate containing the insoluble fraction were charged to rotating evaporators heated by oil baths, and the last traces of solvent were removed at 200° C. and 0.5–1.0 mm. Hg. The soluble fraction, after weighing, was melted and decanted from the flask. The insoluble fraction, after weighing, was dissolved a second time in hot benzene, transferred for concentration on the steam bath, and finally freed of last traces of benzene in a vacuum oven. All samples were found to contain less than 1% kerosene by vapor phase chomatography.

The results obtained are shown in the following table.

TABLE 4.—DIFFERENTIAL SOLUBILITY OF HIGH BOILER IN XYLENE-KEROSENE SOLVENT PAIRS AT ROOM TEMPERATURE

[50 g. HB used]

| Xy/Ke,[1] Volume Ratio | Soluble HB Fraction | | | |
|---|---|---|---|---|
| | Percent Yield | C/H Ratio | Avg. Mol. Wt. | Melting Range, °C. |
| 90:10 | 92.5 | 1.52 | 541 | 80–105 |
| 70:30 | 87.8 | 1.43 | 512 | 80–95 |
| 50:50 | 78 | 1.43 | 468 | 75–85 |
| 30:70 | 73 | 1.37 | 444 | 70–82 |
| 10:90 | 58 | 1.38 | 437 | 60–85 |
| 0:100 | ~40 | | | |

| Xy/Ke,[1] Volume Ratio | Insoluble HB Fraction | | | |
|---|---|---|---|---|
| | Percent Yield | C/H Ratio | Avg. Mol. Wt. | Melting Range, °C. |
| 90:10 | 6.2 | 1.62 | 1,385 | |
| 70:30 | 12 | 1.61 | 1,476 | |
| 50:50 | 24 | 1.64 | 974 | 175–210 |
| 30:70 | 28.6 | 1.51 | 865 | 170–195 |
| 10:90 | 41 | 1.52 | 1,015 | 165–205 |
| 0:100 | 60 | 1.65 | 691 | |

[1] Xy=xylene. Ke=kerosene.

It is evident from comparing the above data with that of Example 1, that yields of the low molecular weight fractions obtained with xylene-kerosene were higher than those from the benzene-hexane experiments of Example 1. This is probably due to the higher solubility of high boiler kerosene. Comparison of the carbon-hydrogen ratios and molecular weights of the soluble and insoluble fractions indicates that high boiler is effectively separated into two mixtures that are similar to those obtained from the benzene-hexane experiments (see Example 1.)

*Example 5*

A factor of great importance in a reclamation process based on a binary solvent system is the rate at which equilibrium between soluble high boiler and solid phase is attained. In order to determine the order of magnitude of this rate in the high boiler-kerosene-xylene system, a series of experiments was performed at 100° C., using 600 ml of a 30:70 by volume xylene/kerosene mixture and, 60 g. of the high boiler (Core I HB) described in Example 1. The results are summarized in the following table:

TABLE 5.—EFFECT OF TIME ON THE DIFFERENTIAL SOLUBILITY OF OMRE HIGH BOILER IN THE SYSTEM XYLENE-KEROSENE AT 100° C.
[60 g. HB used]

| Run No. | Xylol/ Kerosene, Vol. Ratio | Equilibration Time (min.) | Soluble HB Fraction | | Insoluble, Percent Yield |
|---|---|---|---|---|---|
| | | | Percent Yield | Avg. Mol. Wt. | |
| 1 | 30:70 | 10 | 75 | 507 | |
| 2 | 30:70 | 20 | 73 | 419 | 26 |
| 3 | 30:70 | 30 | 74 | 421 | 26 |
| 4 | 30:70 | 60 | 74 | 421 | |
| 5 | 30:70 | 240 | 75 | 443 | 25 |

It is apparent from the above data that equilibrium between the high molecular weight insoluble high boiler fraction and dissolved high boiler in solution is reached very rapidly. This short equilibrium time (probably much less than 10 minutes), is advantageous in a reclamation process involving the use of large quantities of solvents.

*Example 6*

Santowax R (Core II coolant) was used as nuclear reactor coolant until the concentration of high boiler material boiling above p-terphenyl was 22%. A portion of the coolant was then removed and distilled. That portion which boiled above the boiling point of the terphenyls was designated as Core II high boiler. It was used as follows in experiments conducted to determine the effect of high boiler concentration. In these experiments, the total volume of 30:70 volume ratio of xylene-kerosene solvent was held constant as the quantity of high boiler was increased. To the amount of high boiler shown in Table 6 below, the calculated quantity of xylene was added, the resulting mixture was heated at 100° C. with stirring to solution, and the kerosene (warmed to 60° C.) was then added with vigorous stirring, and stirring of the whole was continued at about 100° C. for about 20 minutes. The mixture was then allowed to stand overnight and then processed as in Example 4 for separation of solubles from insolubles. The following results were obtained:

TABLE 6.—EFFECT OF INCREASING HIGH BOILER CONCENTRATION ON RECLAIMED PRODUCT PROPERTIES (SOLUBILIZATION-PRECIPITATION TECHNIQUE)

| Run No. | Gram HB/l. solvent | Reclaimed Product (Soluble Fraction) | | |
|---|---|---|---|---|
| | | Percent Yield | Avg. Mol. Wt. | Viscosity (cp.) at 265° C. |
| 1 | 100 | 77 | 447 | 4.2 |
| 2 | 117 | 73 | 437 | |
| 3 | 133 | 77 | 405 | |
| 4 | 150 | 76 | 430 | 4.0 |
| 5 | 167 | 77 | 418 | 4.5 |
| 6 | 183 | 74 | 391 | 4.3 |
| 7 | 200 | 79 | 393 | 4.4 |
| 8 | 217 | 78 | 385 | 4.7 |
| 9 | 333 | 77 | 405 | 5.0 |
| 10 | 417 | 79 | 395 | 5.2 |

The above data show that as the initial high boiler weight per liter of solvent is increased from 100 g. to 200 g., reclaimed products have essentially the same viscosity. At concentration ranges of 217–417 g./liter of solvent, the viscosity of the mixtures increases, but handling and filtration are still satisfactory.

*Example 7*

This example describes a dilution-precipitation technique of reclaiming the Core I high boiler of Example 1. In this method, instead of first adding the aromatic solvent to the high boiler and then precipitating the resulting solution with the aliphatic component of the binary solvent system, the high boiler is treated in one step with the xylene-kerosene mixture. High boiler (60 g.) was stirred vigorously at 100° C. with 600 ml. of a 30:70 xylene-kerosene mixture for ten minutes; and in another the same procedure was repeated except that the stirring time was 20 minutes. The following results were obtained:

| Time | Soluble, Percent Yield | Avg. Mol. Wt. |
|---|---|---|
| 10 min | 74 | 409 |
| 20 min | 79 | 425 |

The above data show that the one-step process gives yields which are similar to the two-step process. Moreover, the molecular weight of the product is in the same range as that of the two-step process shown in the previous examples.

*Example 8*

This example describes reclamation of spent coolant, rather than of only the high boiler fraction thereof. The spent coolant, which had been employed in an organic nuclear reactor, analyzed as follows by high temperature gas chromatography:

|  | Weight, percent |
|---|---|
| Biphenyl | 6.8 |
| o-Terphenyl | 28.2 |
| m-Terphenyl | 25.1 |
| p-Terphenyl | 2.2 |
| High boiler | 37.7 |

The high boiler was material which volatilized at a temperature substantially above the boiling point of p-terphenyl. It will be noted from the above analysis that 62.3% by weight of spent coolant consists of aromatic hydrocarbons which can be characterized as low boilers, i.e., they boil below the boiling point of the high boiler. The solvent used was Varsol–2, a petroleum fraction (kerosene) B.P. 164°–203° C., analyzing ca. 70% aliphatic and ca. 30% aromatic.

Experiments were conducted wherein 198.2 g. of spent coolant, containing 75.0 g. of high boiler, was stirred vigorously for about 20 minutes at 100° C. with either about 123 g. of the solvent (low boiler/kerosene weight ratio=50:50), or about 287 g. of the solvent (30:70 low boiler to solvent ratio) or about 492 g. of the solvent (20:80 low boiler to solvent ratio). The following results were obtained.

TABLE 8.—DIFFERENTIAL SOLUBILITY OF HIGH BOILER IN SPENT COOLANT-VARSOL-2 SOLVENT PAIR AT 100° C.

| Run No. | Low Boiler Kerosene, Wt. Ratio | Soluble Fraction | | Insoluble Fraction, Percent Yield | |
|---|---|---|---|---|---|
| | | Percent Yield Based on Spent Coolant | Avg. Mol. Wt. | Based on HB | Based on Spent Coolant |
| 1 | 50:50 | ~100 | 273 | 0 | 0 |
| 2 | 30:70 | 88.1 | 260 | 21.5 | 8.1 |
| 3 | 20:80 | 87.3 | 262 | 27.9 | 10.5 |

Comparison of the above data with that of Example 5 wherein a 30:70 xylene-kerosene mixture was used with the separated high boiler, shows that substantially the same results are obtained by using kerosene on spent coolant. While the total volume of kerosene used with the spent coolant is slightly higher than the total volume of xylene plus kerosene used with high boiler the difference is quite insignificant, being 610 ml. of kerosene versus 600 ml. of xylene plus kerosene. Total solvent costs in the latter case are higher, however, because of the higher cost of xylene compared with kerosene.

*Example 9*

The Core I spent coolant described in Example 1 was mixed with petroleum hydrocarbon fraction known to the trade as Varsol–1 and having a boiling point range of 150–200° C. The weight ratio of spent coolant to petroleum fraction was 1:2.5 and the temperature of the process mix was held at 100° C. It was found that a mixing time of 0.5 minute was adequate to bring this process mix to equilibrium. That is, at times longer than this, no additional solids precipitated. Filtration was conducted with a filter aid, employing an 0.1 ft.² leaf filter at a rate of 0.56 liters/0.1 ft.²/min. Solvent was removed from the filtrate by distilling using a packed distillation column at a feed rate of 7 liters/hour at 200 mm. Hg pressure. Under these conditions, a clean-cut separation of solvent from reclaimed spent coolant was obtained.

*Example 10*

The Core II high boiler of Example 6 was used in preparing formulated samples of spent coolant. The high boiler was added to fresh Santowax OMP coolant in concentrations of 5%, 10%, 22%, 30%, 40% and 50%, and the resulting samples were processed with naphtha, B.P. 123°–132° C., (Esso VM and P). Runs were made using two aromatic: aliphatic solvent ratios, 20:80 and 30:70 and the procedure used was that described in Example 9. The following results were obtained:

| Aromatic/ Aliphatic Wt. Ratio | High Boiler concn. in fresh coolant | Wt. of Spent coolant reclaimed/liter solvent, g. | Wt. of High Boiler/liter solvent, g. | Yields, Wt. Percent | |
|---|---|---|---|---|---|
| | | | | Reclaimed Spent coolant | High Mol. Wt. fraction |
| 20:80 | 5 | 198 | 9.9 | 99.5 | 1.0 |
| 20:80 | 10 | 210 | 21 | 91.0 | 2.4 |
| 20:80 | 22 | 241 | 53 | 87.2 | 9.7 |
| 20:80 | 30 | 270 | 81 | 91.5 | 6.3 |
| 20:80 | 40 | 315 | 126 | 90.8 | 5.6 |
| 20:80 | 50 | 378 | 189 | 89.2 | 10.0 |
| 30:70 | 5 | 340 | 17 | 99.0 | 1.0 |
| 30:70 | 10 | 360 | 36 | 96.0 | 1.5 |
| 30:70 | 22 | 414 | 91 | 84.5 | 10.1 |
| 30:70 | 30 | 449 | 135 | 94.0 | 4.8 |
| 30:70 | 40 | 540 | 216 | 90.0 | 6.9 |
| 30:70 | 50 | 648 | 324 | 88.0 | 7.9 |

The above table shows that yields obtained at a given high boiler concentration do not change significantly when the aromatic: aliphatic solvent weight ratio is increased from 20:80 to 30:70. Since the weight of spent coolant reclaimed per liter of solvent is increased markedly at the 30:70 ratio with no loss in fractionation efficiency, this solvent ratio is more economical. The table also shows that even when a 30:70 aromatic: aliphatic reclaiming mixture is used, the weight of the high boiler reclaimed per liter of solvent is only 17 grams at 5% high boiler concentration, 36 grams at 10% high boiler concentration, and 91 grams at 22% high boiler concentration. Accordingly, the process becomes more economical with increase in concentration of high boiler in the spent coolant. Yields of reclaimed coolant were thus found to be generally increased with decreasing high boiler concentration; and total terphenyl hold-up in the high molecular weight fractions was determined generally to be less than 1% of the total weight processed.

*Example 11*

This example describes the use of various solvents for reclamation of Santowax R which was used in operating nuclear reactant until the concentration of high boiler material boiling above the boiling point of para-terphenyl was 22%. This material, hereinafter referred to as Core II spent coolant, was stirred for about two minutes at about 100° C. with one of the following formulated solvents:

(1) n-Decane (100%)
(2) 2,2,4-trimethylpentane (100%)
(3) n-Decane (47.1%), p-xylene (11.6%), cycloheptane (41.3%)
(4) n-Decane (28.3%), trimethylpentane (18.8%), p-xylene (11.6%), cycloheptane (41.3%)

In all instances, the aromatic:aliphatic solvent weight ratio was 30:70, the aromatic being taken as total weight of terphenyls present and the aliphatic as total weight of formulated solvent. The weight percent of reclaimed coolant (RC) and of the separated high molecular weight fraction (HMWF) is shown below:

| Solvent | Wt. Percent RC | Wt. Percent HMWF |
|---|---|---|
| (1) | 91.8 | 8.2 |
| (2) | 77.2 | 22.8 |
| (3) | 90.3 | 9.7 |
| (4) | 87.5 | 12.5 |

The above data show that branching of the paraffinic chain reduces efficacy of the solvent and that the use of a straight-chain paraffin or of a mixture thereof with aromatic and cycloaliphatic hydrocarbons is preferable. In reclamation of spent coolant, the terphenyls already present serve as aromatic solvent, and addition of an aliphatic petroleum hydrocarbon fraction, low in aromatics, precipitates the high molecular weight fraction of the spent coolant.

*Example 12*

Santowax OMP was used as coolant in a nuclear reactor until the concentration of high boiler material boiling above para-terphenyl was about 5%. A portion of the coolant was then removed and distilled. That portion which boiled above the boiling point of p-terphenyl was designated as Core III-A high boiler. It was found to have a lower molecular weight and lower viscosity than either the Core I high boiler of Example 1 or the Core II high boiler of Example 6.

Reclamation of the Core III-A high boiler was effected as follows: 100 g. of the hot (120° C.) high boiler was stirred for 2 minutes with 350 ml. of one of the solvents shown below, the solvent having been heated to 100° C. before mixing it with the high boiler. The mixture was then filtered. The precipitate, comprising the insoluble high molecular weight fraction of high boiler, is denoted as HMWF in the table below. Evaporation of the solvent from the filtrate gave material which represented the soluble portion of the high boiler. This material can be used as fresh coolant and is denoted as reclaimed coolant in the table. Of the four solvents shown, only n-decane was completely aliphatic. Since the aromatic to aliphatic ratio has some effect upon the efficacy of the dilution-precipitation technique, the volume ratio of aromatic to aliphatic hydrocarbons present in the stirred mixture is also shown:

| Solvent | Volume ratio, aromatic to aliphatic | Percent Yields | |
|---|---|---|---|
| | | Reclaimed coolant | HMWF |
| Varsol–1 | 15:85 | 87 | 8 |
| Varsol–2 | 30:70 | 95 | 3 |
| n-Decane | 0:100 | 60 | 35 |
| Naphtha | 11:89 | 81 | 24 |

Varsol–1 is characterized in Example 9 and Varsol–2 in Example 8. The naphtha used in this example is the Esso VM and P naphtha which is characterized in Example 10.

In reclamation of either spent coolant or of high boiler, the straight-chain higher paraffinic hydrocarbon are more effective than are the branched paraffins. Solvents containing alicyclic $C_8$–$C_{12}$ and straight chain $C_8$–$C_{12}$ are more efficient than either the alicyclic or straight chain $C_6$–$C_8$ hydrocarbons and the $C_8$–$C_{12}$ branched chain aliphatics. Solvents containing materials which boil above 200° C. are generally not recommended, since such materials would remain in the reclaimed coolant and thus would act as potential fouling sources.

The principal advantage of spent coolant reclamation versus high boiler reclamation is the elimination of the terphenyl distillation step. This advantage may be considered to outweigh the corresponding disadvantage of using from 1.5 to 3.5 times as much solvent in the spent coolant reclamation process as is needed in the high boiler reclamation process.

The mixing time of solvent with either spent coolant or high boiler need be only a very short time, depending of course, on the nature of the solvent employed. Using an essentially $C_8$–$C_{12}$ paraffinic hydrocarbon with or a mixture thereof with an aromatic hydrocarbon, it has been found that equilibrium is reached within a 30-second period, and that there is essentially no difference in the yield of reclaimed spent coolant obtained from mixing times of 0.5 to 2 minutes. These short mixing times indicate in line mixing for the reclamation process on a commercial scale.

We claim:

1. The method of reclaiming polyphenyl nuclear reactor fluid which comprises contacting (I) a spent fluid which consists essentially of up to about 50 percent by weight of high boiler material formed by pyrolysis and radiolysis of the polyphenyl fluid with the balance being substantially the unchanged fluid with (II) an inert organic liquid which is incapable of dissolving more than 0.3 gram of said high boiler per gram of said liquid and which is selected from the class consisting of lower alkanols, the normally liquid alkanes and cycloalkanes, essentially paraffinic and cycloparaffinic petroleum distillates, alkanones, alkyl ethers and alkyl alkanoates, the portion of said unchanged fluid to (II) being from 90:10 to 10:90 parts by volume and the proportion of the total volume of said unchanged fluid plus (II) to the volume of (I) being from 2:1 to 20:1, separating the precipitate; and removing from the resulting solution material boiling substantially below the boiling point of the polyphenyl nuclear reactor fluid to recover said fluid as residue.

2. The method of claim 1 further limited in that (II) is a hydrocarbon boiling between 80° C. to 280° C., consisting up to 100 percent of saturated aliphatic hydrocarbons, and having an aromatic hydrocarbon content of not more than 70 percent by weight.

3. The method of reclaiming polyphenyl nuclear reactor fluid which comprises contacting (A) the high boiler material which is the pyrolysis and radiolysis product of said fluid and which boils above the boiling point of said fluid with (B) an inert organic solvent for said high boiler which is capable of dissolving at least 0.7 gram of high boiler per gram of solvent and is selected from the class consisting of carbon tetrachloride, chloroform, tetrahydrofuran, diethylene glycol dimethyl ether and benzenoid hydrocarbons which are free of olefinic and acetylenic unsaturation and boil below the boiling point of said high boiler material, and (C) an inert organic liquid which is incapable of dissolving more than 0.3 gram of the high boiler per gram of said liquid and is selected from the class consisting of lower alkanols, the normally liquid alkanes and cycloalkanes, essentially paraffinic and cycloparaffinic petroleum distillates, alkanones, alkyl ethers and alkyl alkanoates, the proportion of (B) to (C) being from 90:10 to 10:90 parts by volume and the proportion of the total volume of (B) plus (C) to the volume of (A) being from 2:1 to 20:1; separating the resulting precipitate; and removing from the residue material boiling substantially below the boiling point of the polyphenyl nuclear reactor fluid to recover said fluid.

4. The method of claim 3 further limited in that (A) is the pyrolysis and radiolysis product of a polyphenyl fluid consisting of at least 90% by weight of terphenyl.

5. The method of claim 3, further limited in that (B) is xylene.

6. The method of claim 3, further limited in that (B) is benzene.

7. The method of claim 3, further limited in that (C) is a hydrocarbon boiling between 80° C. to 280° C., consisting up to 100 percent of saturated aliphatic hydrocarbons, and having an aromatic hydrocarbon content of not more than 70 percent by weight.

8. The method of claim 3, further limited in that (C) is n-decane.

9. The method of claim 3, further limited in that (C) is ethyl ether.

10. The method of claim 3 further limited in that (A) is the pyrolysis and radiolysis product of a polyphenyl fluid consisting at least 90 percent by weight of terphenyl, (B) is xylene and (C) is a hydrocarbon boiling between 80° C. to 280° C., consisting up to 100 percent of saturated aliphatic hydrocarbons, and having an aromatic hydrocarbon content of not more than 70 percent by weight.

References Cited by the Examiner

UNITED STATES PATENTS 2,216,130  10/1940  Pier et al. _____ 260—668
2,415,541  2/1947  Soday _____ 260—668

DELBERT E. GANTZ, *Primary Examiner.*

J. R. LIBERMAN, *Examiner.*

C. E. SPRESSER, *Assistant Examiner.*